United States Patent [19]

Kim

[11] Patent Number: 5,406,361
[45] Date of Patent: Apr. 11, 1995

[54] CIRCUIT FOR CONTROLLING TEMPERATURE OF A FUSER UNIT IN A LASER PRINTER

[75] Inventor: Yong-Geun Kim, Kyungki-do, Rep. of Korea

[73] Assignee: SamSung Electronics Co., Ltd., Kyungki-do, Rep. of Korea

[21] Appl. No.: 108,491

[22] Filed: Aug. 18, 1993

[30] Foreign Application Priority Data

Aug. 18, 1992 [KR] Rep. of Korea .............. 14816/1992

[51] Int. Cl.⁶ .................. G03G 15/20; G03G 21/00
[52] U.S. Cl. ........................... 355/285; 219/216
[58] Field of Search ............... 355/285, 289, 290; 219/216

[56] References Cited

U.S. PATENT DOCUMENTS

| | | | |
|---|---|---|---|
| 3,781,516 | 12/1973 | Tsilibes et al. | 219/216 |
| 3,790,747 | 2/1974 | Klavsons et al. | 219/216 |
| 3,851,144 | 11/1974 | Hutner | 219/216 |
| 3,946,199 | 3/1976 | Nakamura | 219/216 X |
| 4,001,545 | 1/1977 | Wada et al. | 219/216 |
| 4,113,375 | 9/1978 | Murata et al. | 355/285 |
| 4,316,719 | 2/1982 | Motomura et al. | 355/290 X |
| 4,340,807 | 7/1982 | Raskin et al. | 219/216 X |
| 4,415,800 | 11/1983 | Dodge et al. | 219/216 X |
| 4,435,677 | 3/1984 | Thomas | 219/216 X |
| 4,650,347 | 3/1987 | Shigemura et al. | 219/494 X |
| 4,745,430 | 5/1988 | Tsuchiya | 219/216 X |
| 4,968,872 | 11/1990 | Kusumoto | 355/290 X |
| 5,032,874 | 7/1991 | Matsuuchi | 355/285 |
| 5,063,459 | 11/1991 | Nakatani et al. | 355/285 X |
| 5,241,349 | 8/1993 | Nagasaka | 355/285 |
| 5,274,402 | 12/1993 | Serizawa et al. | 355/316 X |

Primary Examiner—Fred L. Braun
Attorney, Agent, or Firm—Robert E. Bushnell

[57] ABSTRACT

A system for controlling temperature of a fuser unit in an laser printing device, without central processor control, includes a converting circuit for generating a temperature dependent voltage indicative of a sensed temperature of a fusing unit, a determining circuit for generating one of a first reference voltage signal corresponding to a predetermined operational temperature of the fusing device and a second reference voltage signal corresponding to a predetermined standby temperature of the fusing device; and a control signal circuit for generating a control signal in response to comparisons of the temperature dependent voltage to the generated one of the first reference voltage signal and the second reference voltage signal, the control signal for enabling a heating device to heat the fuser unit.

20 Claims, 2 Drawing Sheets

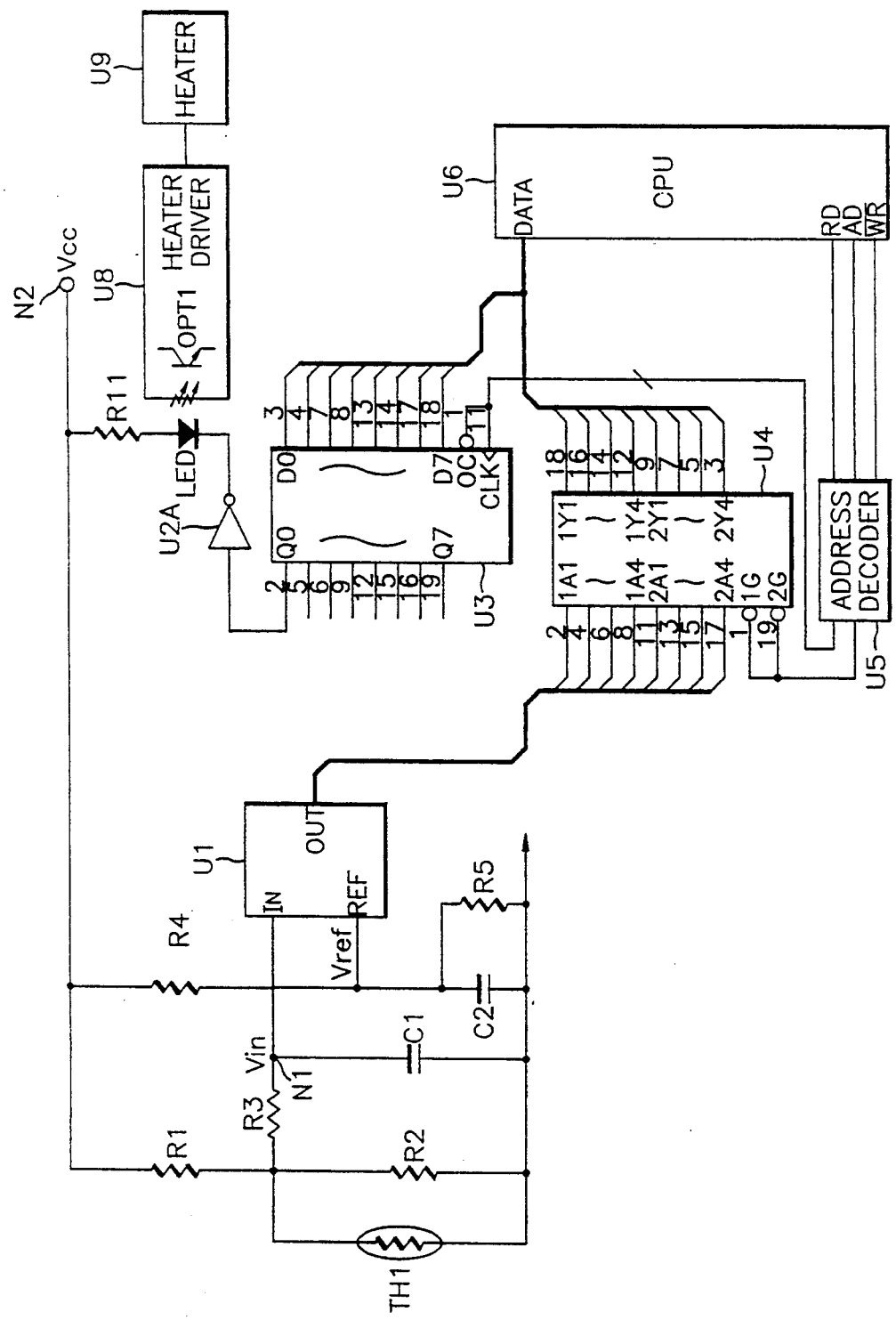
FIG. 1
CONVENTIONAL

CIRCUIT FOR CONTROLLING TEMPERATURE OF A FUSER UNIT IN A LASER PRINTER

FIELD OF THE INVENTION

The present invention relates to a circuit for controlling the temperature of a fuser unit in an image forming device and, more particularly, to a circuit for controlling the temperature of a fuser unit in a laser printer independently of microprocessor control.

BACKGROUND OF THE INVENTION

Laser printers have photosensitive drums that are selectively illuminated by light emitting diode arrays in response to an image to be printed. The exposure of the photosensitive drum generates a latent electrostatic image on its surface. This electrostatic image is developed by then exposing the photosensitive drum to toner which adheres to the charged portions of the drum. The toner on the photosensitive drum is then transferred to paper where it is fused by a fuser unit's application of heat. Usually, the fuser unit comprises a pair of opposed heated rollers between which the paper is fed. To fuse the toner to the paper, the fuser unit must be maintained at a temperature of approximately 150° C. to 200° C. A heater performs this function.

In conventional laser printers, the heater is controlled by the central processing unit of the laser printer. A typical example of a prior art system for controlling the temperature of a fuser unit of a laser printer is disclosed in U.S. Pat. No. 4,650,347 for *Temperature Detector* to Yutaka Shigemura, et al. As described in Shigemura, et al., a central processing means controls a three level analog-to-digital converter (shown in Shigemura, et al., as elements 534, 536, 540, 542) which generates digital signals indicative of a temperature of heating rollers. These digital signals are then provided to a controller which operates the heating element. In other conventional laser printers, a temperature sensor first detects the temperature of the fuser unit, an analog-to-digital converter then converts the detected temperature to a digital signal. The central processing unit receives this digital signal from latches controlled by address decoders and then determines whether or not the heater must be driven to maintain the fuser unit at the desired temperature.

Conventional laser printers in which the heater is controlled by the central processing unit have a number of drawbacks. First, the components necessary for converting the output of the temperature sensor into digital signals include the analog-to-digital converter, latches, and decoders. These additional components are costly which tends to increase the total cost of the laser printer. Moreover, since the central processing unit must constantly monitor the temperature of the fuser unit and control the driving of the heater, machine cycles of the central processing unit are required to perform these essentially mundane tasks. This factor is especially troublesome in the temperature detector of Shigemura, et al. where the central processing means must actually control the digital conversion operation of the analog-to-digital converter. Therefore, conventional laser printers must have either a faster central processing unit to control both the heater and the sensor in addition to the other functions of the laser printer or the overall speed of the laser printer must be slower.

SUMMARY OF THE INVENTION

Accordingly, it is an object of the present invention to provide an improved system for controlling the temperature of a fuser unit in an image forming device.

It is another object of the present invention to provide an improved system for controlling the heater of a fuser unit.

It is a further object of the present invention to provide a system for controlling the circuit that overcomes the aforementioned drawbacks and shortcomings.

It is still another object of the present invention to provide an advanced system that controls temperature of a fuser unit in an image forming device in various ranges without requiring microprocessor control or requiring relatively expensive circuit elements.

In accordance with the present invention, there is provided a system for controlling temperature of a fuser device in an image forming device, including a converting circuit for generating a temperature dependent voltage indicative of a sensed temperature of a fusing device, the fusing device for fusing toner to paper by application of heat, a determining circuit for generating one of a first reference voltage signal corresponding to a predetermined operational temperature of the fusing device and a second reference voltage signal corresponding to a predetermined standby temperature of the fusing device; and a control signal circuit for generating a control signal in response to comparisons of the temperature dependent voltage to the generated one of the first reference voltage signal and the second reference voltage signal, the control signal for enabling a heating device to heat the fuser unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a schematic circuit diagram illustrating a conventional system for controlling a heater in a laser printer.

DETAILED DESCRIPTION OF THE INVENTION

Figure 2:
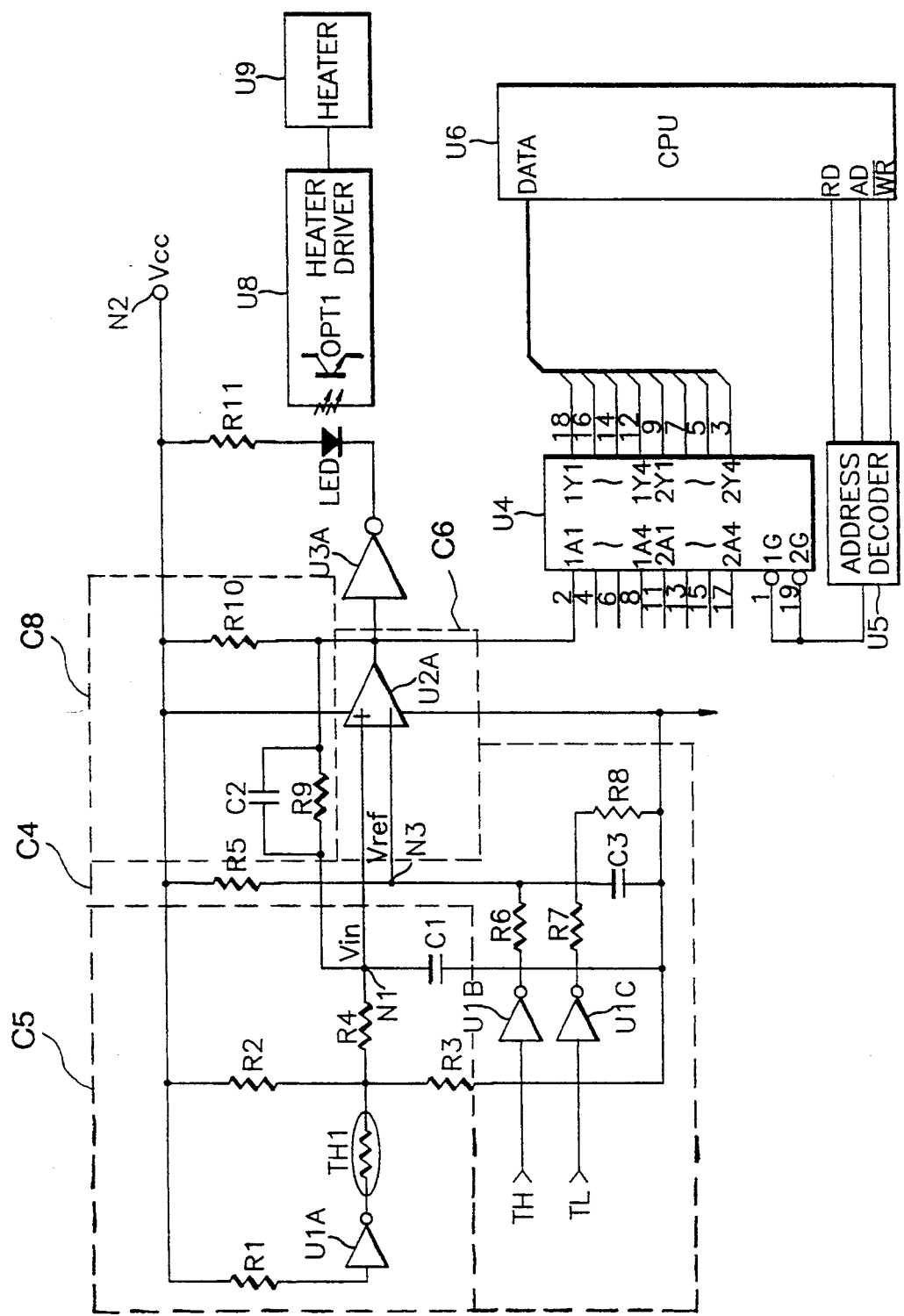
FIG. 2 is a schematic circuit diagram of a heater control system constructed according to the principles of the present invention.

Turning now to the drawings, the construction and operation of a conventional heater control system for a laser printer will be described by reference to FIG. 1. In FIG. 1, a heater U9 heats a fuser unit, not shown. A thermistor TH1 is positioned in close physical proximity to the fuser unit so that the temperature of the thermistor itself is directly affected by the current temperature of the fuser unit. This thermistor TH1 is part of an electrical circuit in which the thermistor TH1 is connected between a node N3 and a ground voltage terminal, a resistor R1 is connected between a source voltage terminal N2 and the node N3, a resistor R2 connected between the node N3 and the ground voltage terminal, a resistor R3 is connected between the node N3 and a node N1, and a capacitor C1 connected between the node N1 and the ground voltage terminal. Since the resistance of the thermistor varies as a function of its temperature, the node N1 provides a temperature dependent voltage $V_{in}$ which is a function of the current temperature of the fuser unit.

An analog-to-digital converter U1 generates digital data indicative of a voltage difference between the temperature dependent voltage $V_{in}$ and a reference voltage $V_{ref}$ of a node N4. The reference voltage $V_{ref}$ is generated by a voltage divider comprising a resistor R4 connected between the source voltage terminal N2 providing a source voltage $V_{cc}$ and the node N4, and a resistor R5 and capacitor C2 connected in parallel between the node N4 and the ground voltage terminal.

The digital data generated by the analog-to-digital converter U1 is provided to a buffer U4 which reads and writes the digital data under control of an address decoder U5. The address decoder U5 receives a read signal RD, a write signal WR, and an address signal AD generated by the central procelssing unit CPU. When the central processing unit CPU generates the write signal WR and the address signal AD according to a program, the buffer U4 latches the digital data from the analog-to-digital converter U1. The digital data in the buffer U4 is then provided to both the central processing unit CPU and a latch U3 when the write signal WR and the address signal AD are generated from the central processing unit CPU.

The central processing unit CPU compares the digital data indicative of the current temperature of the fuser unit with a desired temperature stored internally by the central processing unit CPU. When the current temperature is lower than the desired temperature, the central processing unit CPU generates a "low" write signal WR to the address decoder U5 which causes the address decoder to enable the latch U3. Enabling the latch U3 generates a "high" voltage signal at an output terminal Q0 of that latch. An inverter U2A receives and inverts the "high" voltage signal from the output terminal Q0 thereby generating a "low" voltage signal at a cathode of a light emitting diode LED. The light emitting diode, having an anode connected to the supply voltage terminal, responds by emitting light.

The light emitted by the light emitting diode LED operates a phototransistor OPT1 of a heater driver U8 causing the heater driver U8 to supply electrical power to the heater U9 to raise the temperature of the fuser unit.

In contrast, when a sensed current temperature is higher than the desired temperature, the output terminal Q0 of the latch U3 outputs "low" signal so that the light emitting diode does not emit light, and consequently, the heater U9 is not driven by the heater driver U8.

Currently available conventional heater control systems such as that described in the foregoing paragraphs, suffer from a number of drawbacks and shortcomings. First, control of the heater requires machine cycles of the central processing unit CPU since it must continuously compare the digital data indicative of the current temperature of the fuser unit to the stored desired temperature. Furthermore, the conventional system requires a dedicated analog-to-digital converter U1 to generate the digital data, which increases the overall cost of the laser printer.

To address the foregoing problems, FIG. 2 illustrates a heater control system constructed according to the principles of the present invention that overcomes the drawbacks associated with the conventional heater control system described above.

Referring now to FIG. 2, a converting circuit C5 generates a temperature dependent voltage $V_{in}$, at node N1, which is dependent upon a sensed temperature of a fuser unit U6. More specifically, a thermistor TH1 is positioned in close physical proximity to fuser rollers of the fuser unit U6 so that the temperature of the thermistor itself is directly affected by the current temperature of the fuser rollers. The thermistor TH1 is part of the converting circuit C5 in which the thermistor TH1, a resistor R1 and an inverter U1A are serially connected between a source voltage terminal N2 and a node N4. Positioning of the inverter U1A before the thermistor TH1 enhances the linearity of the thermistor's resistance as a function of its temperature. A resistor R2 is connected between the source voltage terminal N2 and the node N4, while a resistor R3 is connected between the node N4 and a ground voltage terminal. A resistor R4 couples the node N4 and a node N1, while a capacitor C1 couples the node N1 to the ground voltage terminal.

A determining circuit C4 generates a reference voltage $V_{ref}$ at a node N3 which is indicative of a desired temperature of the fuser unit. Specifically, a high temperature heater signal TH is enabled to a "high" logic state if the fuser unit's temperature is desired to be at an operational temperature for a printing operation. A low temperature heater signal TL is enabled to a "high" logic state if the fuser unit's temperature is desired to be at a standby temperature which is less than the operational temperature but high enough that the fuser unit's temperature can be quickly raised to the operational temperature if printing is required.

The determining circuit C4 comprises inverters U1B and U1C for inverting the high temperature heater signal TH and the low temperature heater signal TL, respectively. Resistors R6 and R7 couple the output terminals of the inverters U1B and U1C, respectively, to the node N3. A resistor R5 is connected between the source voltage terminal N2 and the node N3. Further, resistor R8 and a capacitor C3 are connected in parallel between the node N3 and the ground voltage terminal.

A control signal generating circuit C6 generates a control signal for controlling the driving of the heater U9 in response to comparisons of the temperature dependent voltage $V_{in}$ of the node N1 and the reference voltage $V_{ref}$ of the node N3. Specifically, the control signal generating circuit C6 comprises a comparator U2A, which has an non-inverting terminal connected to the node N1 to receive temperature dependent voltage $V_{in}$, and an inverting terminal connected to the node N3 to receive the reference voltage $V_{ref}$.

An output terminal of the comparator U2A is connected to provide the control signal to an inverter U3A. The inverter U3A generates an inverted control signal by inverting the control signal generated by the comparator U2A. Between the output of the inverter U3A and a supply voltage terminal N2, a resistor R11 and a light emitting diode LED are serially connected. That is, a cathode of the light emitting diode LED is connected to the output of the inverter U3A, and its anode is connected to the resistor R11.

A heater driver U8 controls the driving of the heater U9 of the fuser unit U6 and is located is close physical proximity to the light emitting diode LED so that the generated light is detected by a phototransistor OPT1 of the heater driver U8. Specifically, a "high" voltage state of control signal causes the inverter to drive the light emitting diode LED. The generated light is sensed by the phototransistor OPT1 which enables the heater driver U8 to drive the heater U9 to raise the temperature of the fuser unit U6.

A hysterisis circuit C8 is connected in a positive feedback configuration between the output terminal of the comparator U2A and the node N1. The hysterisis circuit C8 stabilizes the driving of the heater U9 so that it tends to maintain a heating operation for extended periods of time rather than quickly cycling between an on and off state. Additionally, the hysterisis circuit C8 removes noise generated by rapid conversions of the control signal generated at the output of the comparator U2A in order to further stabilize the output of the comparator U2A. The hysterisis circuit C8 comprises a resistor R10 connected between the supply voltage terminal N2 and the output terminal of the comparator U2A. The hysterisis circuit C8 also comprises a resistor R9 in parallel with a capacitor C2 between the output terminal of the comparator U2A and the node N1.

The control signal generated at the output of the comparator U2A is also provided to a buffer U4. The buffer reads and writes the control signal as digital driving data under control of an address decoder U5 so that a central processing unit CPU is provided with indications of whether the heater is currently being driven. More specifically, the address decoder U5 receives a read signal RD, a write signal WR, and an address signal AD generated by the central processing unit CPU. When the central processing unit CPU generates the write signal WR and the address signal AD according to a predetermined program, the buffer U4 latches the digital driving data, i.e., the control signal. The digital driving data in the buffer U4 is then provided to the central processing unit CPU when the write signal WR and the address signal AD are generated by the central processing unit CPU.

Now, the operation of the preferred embodiment of the present invention will be described in detail by reference to FIG. 2. It should be noted that because of the preferred embodiment's constitution, the central processing unit CPU is not required to control the maintenance of the fuser unit's temperature.

The sensed temperature dependent voltage $V_{in}$ is provided at node N1 in response to the temperature dependent resistance of the thermistor TH1, and consequently, the temperature dependent voltage is a function of the fuser unit's temperature. Simultaneously, the reference voltage $V_{ref}$ is provided at node N3 in response to the logic states of the high temperature heater signal TH and the low temperature heater signal TL. In the preferred embodiment, at least one of the high temperature heater signal TH and the low temperature heater signal TL is always in "low" logic state to provide two temperature state operation, i.e., the operational temperature and the standby temperature. The generation of the high temperature heater signal TH and the low temperature heater signal TL can be accomplished automatically by the central processing unit CPU or by user selection. Alternatively, the determining circuit could be modified to account for both the high temperature heater signal TH and the low temperature heater signal TL to be simultaneously logic "high" to provide for three temperature state operation.

The high temperature heater signal TH is indicative of a desired fuser unit temperature of 200° C., the low temperature heater signal TL is indicative of a desired fuser unit temperature of 150° C. The high temperature heater signal TH and the low temperature heater signal TL are converted into an appropriate reference voltage $V_{ref}$ by the selection of the resistance values of the resistors R6 and R7, respectively. The resistance values of resistors R6 and R7 must be chosen so that the reference voltage $V_{ref}$ directly correlates to the temperature dependent voltage $V_{in}$ when the temperature of the fuser unit is at the operational temperature of 200° C. and the standby of 150° C.

When temperature of the fuser unit is desired to be the operational temperature, the high temperature heater signal TH is enabled to be a logic "high" state, and the low temperature heater signal TL is enabled to be a logic "low" state. In this condition the resistor R6 becomes a load resistor and the resistor R7 becomes a full-up resistor. Consequently, the reference voltage $V_{ref}$ can be obtained according to the following equation:

$$V_{ref} = V_{cc} \times \frac{R6 \| R8}{R7 \| R5 + R6 \| R8} \quad (1)$$

Assuming that temperature of the fuser unit is below the operation temperature, the resistance of the thermistor TH1 is higher than it would be if the temperature of the fuser unit were already at the operational temperature owing to the fact the resistance of the thermistor decreases with an increasing temperature. Accordingly, the temperature dependent voltage $V_{in}$ will be higher than the reference voltage $V_{ref}$. As a result, the comparator U2A generates a logic "high" control signal which causes the light-emitting diode LED to emit light. The heater driver responds to the emitted light by driving the heater U9 to heat the fuser unit U6.

As the fuser unit's temperature increases, the resistance of the thermistor TH1 decreases thereby lowering the temperature dependent voltage $V_{in}$. Once the temperature dependent voltage $V_{in}$ drops below the reference voltage $V_{ref}$, the comparator U2A responds by generating a logic "low" control signal which causes the heater driver U8 to cease driving the heater U9.

When temperature of the fuser unit is desired to be the standby temperature, the high temperature heater signal TH is enabled to be a logic "low" state, and the low temperature heater signal TL is enabled to be a logic "high" state. In this condition the resistor R7 becomes a load resistor and the resistor R6 becomes a full-up resistor and the reference voltage $V_{ref}$ can be obtained according to the following equation:

$$V_{ref} = V_{cc} \times \frac{R7 \| R8}{R6 \| R5 + R7 \| R8} \quad (2)$$

Under these circumstances, two possible scenarios exist. When the temperature of fuser unit is already greater than the standby temperature of 150° C., the temperature dependent voltage $V_{in}$ will be lower than the reference voltage $V_{ref}$. As a result, the comparator U2A generates a logic "low" control signal, which results in the heater driver U8 not driving the heater U9.

In the second possible scenario, when the temperature of the fuser unit is below the standby temperature, resistance of the thermistor TH1 is comparatively high. Thus, the temperature dependent voltage $V_{in}$ is higher than the reference voltage $V_{ref}$, and accordingly, the comparator U2A generates a logic "high" control signal which results in the driving of the heater U9 to heat the fuser unit.

When no heating is desired at any temperature of the fuser unit, both the high temperature heater signal TH and the low temperature heater signal TL are enabled to be a logic "low" state. As result both resistor R6 and R7 become full-up transistors. For this situation the resistors R5, R6, R7 and R8 are chosen so that the reference voltage $V_{ref}$ is always greater than the temperature dependent voltage $V_{in}$ so that the comparator U2A continuously generates a logic "low" control signal. Therefore, the heater will never be driven in this situation.

In the above-described preference embodiment of the inventive heater control system, the simultaneous logic "high" condition of both the high temperature heater signal TH and the low temperature heater signal TL should be inhibited. One skilled in the art would understand how to modify the circuit so that the simultaneous logic "high" condition of both the high temperature heater signal TH and the low temperature heater signal TL would be possible to provide for a third possible fuser temperature.

As described above, according to the present invention, the two temperature states, the operation temperature and the standby temperature are automatically controlled by hardware. Moreover, a third state, a heater off state, is provided in which the heater will not be driven at all regardless of the fuser unit temperature. The hardware accomplished the heater control without the necessity of high-priced analog-to-digital converter used in the conventional control circuit. Further, since the present invention does not depend on a software control, the central processing unit has more machine cycles to perform other jobs such as processing other data thereby increasing overall printing speeds.

While there is shown and described the preferred embodiment of the present invention, it will be understood by those skilled in the art that foregoing and other change in form and details may be made without departing from the spirit and scope of the present invention. For example, the number of temperature selecting terminals can be either increased or decreased and the resistors in the determining circuit can be substituted for variable resistors or other equivalents.

I claim:

1. A temperature control circuit of an image forming apparatus, comprising:

converting means for generating a temperature dependent voltage indicative of a sensed temperature of a fusing device, said fusing device for fusing toner to paper by application of heat;

determining means for generating one of a first reference voltage signal corresponding to a predetermined operational temperature of said fusing device, a second reference voltage signal corresponding to a predetermined standby temperature of said fusing device and a third reference voltage signal indicative of a selection of a disabled state of said temperature dependent voltage to the generated one of said first reference voltage signal and said second reference voltage signal and disabling generation of said control signal in response to said third reference voltage signal for any state of said temperature dependent voltage, said control signal for enabling a heating device to heat said fuser device.

2. A temperature control circuit as claimed in claim 1, further comprising means for providing positive feed back to said control signal generating means to stabilize the generation of said control signal.

3. A temperature control circuit as claimed in claim 2, wherein said positive feed back means comprises a parallel connected resistor and capacitor.

4. A temperature control circuit as claimed in claim 1, wherein said converting means comprises a thermistor positioned in close physical proximity to said fusing device.

5. A temperature control circuit as claimed in claim 4, wherein said converting circuit further comprises compensating means for improving a linear temperature response of said thermistor.

6. A temperature control circuit as claimed in claim 1, wherein said converting circuit comprises
 a thermistor positioned in close physical proximity to said fusing device; and
 an inverter connected between a supply voltage terminal and said thermistor for improving a linear temperature response of said thermistor.

7. A temperature control circuit as claimed in claim 1, wherein said determining means comprises:
 means for receiving a first temperature selection signal and a second temperature selection signal generated by a central processing unit of said image forming apparatus; and
 reference signal generating means for generating said first reference voltage signal and said second reference voltage signal in response to said first temperature selection signal and said second temperature selection signal.

8. A temperature control circuit as claimed in claim 7, wherein said receiving means comprises inverting means for generating a first inverted signal and a second inverted signal by inverting said first temperature selection signal and said second temperature selection signal, respectively.

9. A temperature control circuit as claimed in claim 8, wherein said reference signal generating means comprises voltage dividing means for generating said first reference voltage signal and said second reference voltage signal by voltage dividing said first inverted signal and said second inverted signal, respectively, to different voltage levels.

10. A temperature control circuit as claimed in claim 9, further comprising:
 a heater driver for driving said heating device in response to a conductive state of an phototransistor;
 a light emitting diode, optically coupled to said phototransistor, for emitting light to change a conductive state of said phototransistor; and
 an inverter for driving said light emitting diode in response to said control signal.

11. A temperature control circuit as claimed in claim 1, further comprising:
 a heater driver for driving said heating device in response to a conductive state of an phototransistor;
 a light emitting diode, optically coupled to said phototransistor, for emitting light to change a conductive state of said phototransistor; and
 an inverter for driving said light emitting diode in response to said control signal.

12. A temperature control circuit for fusing rollers of an electrostatic printing device, said fusing rollers for fusing toner to paper, said circuit comprising:
- converting means for generating a temperature dependent voltage indicative of a sensed temperature of fusing rollers;
- determining means for generating one of a first reference voltage signal corresponding to a predetermined operational temperature of said fusing rollers, a second reference voltage signal corresponding to a predetermined standby temperature of said fusing rollers and a third reference voltage signal indicative of a selection of a disabled state of said heating means;
- means for generating a control signal in response to comparisons of said temperature dependent voltage to the generated one of said first reference voltage signal and said second reference voltage signal and disabling generation of said control signal in response to said third reference voltage signal for any state of said temperature dependent voltage;
- heating means for heating said fusing rollers; and
- driving means for driving said heating means in response to said control signal.

13. A temperature control circuit as claimed in claim 12, wherein said determining means comprises:
- means for receiving a first temperature selection signal and a second temperature selection signal generated by a central processing unit of said electrostatic printing device; and
- reference signal generating means for generating said first reference voltage signal and said second reference voltage signal in response to said first temperature selection signal and said second temperature selection signal.

14. A temperature control circuit as claimed in claim 13, wherein said receiving means comprises inverting means for generating a first inverted signal and a second inverted signal by inverting said first temperature selection signal and said second temperature selection signal, respectively.

15. A temperature control circuit as claimed in claim 14, wherein said reference signal generating means comprises voltage dividing means for generating one of said first reference voltage signal and said second reference voltage signal by voltage dividing said first inverted signal and said second inverted signal, respectively, to different voltage levels.

16. A temperature control circuit as claimed in claim 15, further comprising:
- a heater driver for driving said heating means in response to a conductive state of an phototransistor;
- a light emitting diode, optically coupled to said phototransistor, for emitting light to change a conductive state of said phototransistor; and
- an inverter for driving said light emitting diode in response to said control signal.

17. A temperature control circuit as claimed in claim 12, further comprising:
- a heater driver for driving said heating means in response to a conductive state of an phototransistor;
- a light emitting diode, optically coupled to said phototransistor, for emitting light to change a conductive state of said phototransistor; and
- an inverter for driving said light emitting diode in response to said control signal.

18. A temperature control circuit for fusing rollers of an electrostatic printing device, said fusing rollers for fusing toner to paper, comprising:
- converting means for generating a temperature dependent voltage indicative of a sensed temperature of fusing rollers;
- determining means for generating one of a first reference voltage signal corresponding to a predetermined operational temperature of said fusing rollers, a second reference voltage signal corresponding to a predetermined standby temperature of said fusing rollers and a third reference voltage signal indicative of a selection of a disabled state of said heating means;
- means for generating a control signal in response to comparisons of said temperature dependent voltage to the generated one of said first reference voltage signal and said second reference voltage signal and disabling generation of said control signal in response to said third reference voltage signal for any state of said temperature dependent voltage;
- heating means for heating said fusing rollers; and
- driving means for driving said heating means in response to said control signal.

19. A temperature control circuit as claimed in claim 18, wherein said determining means comprises:
- means for receiving a first temperature selection signal and a second temperature selection signal generated by a central processing unit of said electrostatic printing device; and
- reference signal generating means for generating said first reference voltage signal and said second reference voltage signal in response to said first temperature selection signal and said second temperature selection signal.

20. A temperature control circuit as claimed in claim 19, further comprised of:
- said reference signal generating means for generating a third reference voltage signal indicative of a selection of a disabled state of said heating means in response to said first temperature selection signal and said second temperature selection signal being the same logic state; and
- said control signal generating means disabling generation of said control signal in response to said third reference voltage signal for any state of said temperature dependent voltage.

* * * * *